US008498184B1

(12) United States Patent
Kudinar et al.

(10) Patent No.: US 8,498,184 B1
(45) Date of Patent: Jul. 30, 2013

(54) INTERCHANGEABLE DISK CLAMP

(75) Inventors: Rusmin Kudinar, Fremont, CA (US); Alireza Shahdoostmoghadam, San Jose, CA (US); Arthur Kwun, Emeryville, CA (US); Hung Nguyen, Santa Clara, CA (US); Darren Seawright, San Jose, CA (US); Robert Ocheltree, Danville, CA (US); Frederick Miller, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 1091 days.

(21) Appl. No.: 12/478,642

(22) Filed: Jun. 4, 2009

Related U.S. Application Data

(60) Provisional application No. 61/059,879, filed on Jun. 9, 2008.

(51) Int. Cl.
*G11B 21/08* (2006.01)
*G11B 7/085* (2006.01)
*G11B 17/22* (2006.01)

(52) U.S. Cl.
USPC ............. 369/30.43; 369/30.55; 369/30.57; 369/30.45; 901/40

(58) Field of Classification Search
USPC .... 360/69, 71, 92.1; 369/30.31, 30.55–30.57, 369/30.7–30.72, 30.85–30.87, 30.42–30.45, 369/30.53–30.57, 30.66–30.72; 901/6, 31, 901/40, 51; 483/19, 901; 720/706
See application file for complete search history.

(56) References Cited

U.S. PATENT DOCUMENTS

| 2,557,260 | A | * | 6/1951 | Clark ............................ 294/183 |
| 4,621,854 | A | * | 11/1986 | Boley et al. .................... 294/197 |
| 4,627,785 | A | * | 12/1986 | Monforte ....................... 414/730 |
| 4,636,135 | A | * | 1/1987 | Bancon .......................... 414/730 |
| 4,831,721 | A | * | 5/1989 | Hirai et al. ....................... 29/740 |
| 5,172,922 | A | * | 12/1992 | Kowaleski et al. ................ 279/3 |
| 5,192,070 | A | * | 3/1993 | Nagai et al. ..................... 271/90 |
| 5,485,436 | A | * | 1/1996 | Forget et al. ............... 369/30.52 |
| 5,549,340 | A | * | 8/1996 | Nagai et al. .................... 294/189 |
| 5,933,396 | A | * | 8/1999 | Hammar et al. ........... 369/30.43 |
| 2003/0216715 | A1 | * | 11/2003 | Moll et al. ......................... 606/1 |
| 2004/0163268 | A1 | * | 8/2004 | McMurtry et al. .............. 33/556 |

* cited by examiner

*Primary Examiner* — Wayne Young
*Assistant Examiner* — Adam B Dravininkas
(74) *Attorney, Agent, or Firm* — Luedeka Neely Group, P.C.; Rick Barnes

(57) ABSTRACT

A media processing system for processing media having differing properties, the media processing system having a base. The base has a base radial alignment portion, a base vertical alignment portion, and a base retention portion. A set of removable media clamps is included, where each of the set of removable media clamps is adapted for the differing properties of the media, each removable media clamp has a removable media clamp radial alignment portion for engaging the base radial alignment portion and radially aligning the removable media clamp with the base, a removable media clamp vertical alignment portion for engaging the base vertical alignment portion and vertically aligning the removable media clamp with the base, and a media engagement portion for engaging the media. The retention portion is controllable by the media processing system to selectively retain and release a mounted one of the removable media clamps without manual intervention.

19 Claims, 6 Drawing Sheets

INTERCHANGEABLE DISK CLAMP

This application claims all rights and priority to U.S. provisional patent application Ser. No. 61/059,879 filed 2008 Jun. 9. This invention relates to the field of data storage media, such as disk media. More particularly, this invention relates to a system for the automated handling of different sizes of media.

FIELD

Background

Media for the storage of digital data, such as computer data, is in high demand in the current market. As the term is used herein, media includes disk media such as magnetic disks for hard drives, magnetic disks for floppy drives, and optical disks such as CD and DVD disks. While demand for such media is very high, the demand is only high for media that is relatively reliable and can be provided at a relatively low price. Careful inspection and handling of the media through the fabrication process tends to make the media more reliable. The automation of the handling of the media through such processing tends to make the media less expensive. Thus, robotic handlers have become commonplace in media processing facilities, especially in applications such as testing and inspection.

Such media comes in a number of different sizes. These various sizes of media require different sizes of tooling, where the size of the tooling is adapted to the size of the media. For example, a separate and properly sized tool (generally called an end effector herein) is provided to hold each of the different sizes of media to be processed. Therefore, each time a different size of media is processed, a different size of end effector must be swapped out and mounted, which is a time-consuming—and thereby costly—process.

Current disk media inspection systems can only accommodate two different sizes of media without requiring human intervention to swap out the end effectors. They do this by having duplicate end effectors of different sizes within each system. Of course, scaling this to additional media sizes means having more and more duplicated end effectors, which runs into a tremendous capital cost. Thus, to handle more than two sizes of media with these systems requires the manual removal of one end effector and the subsequent installation of a different sized end effector.

This is accomplished by halting the system, unscrewing or unbolting the end effector, replacing the end effector with a different end effector, and screwing or bolting the new end effector in place. Typically, some type of realignment process must also be completed, due to the nature of the swap-out procedure. Not only is this time consuming and expensive, but improper installation or removal of the end effectors may permanently damage either the end effectors themselves or other parts of the system. The more that the system is subjected to such a manual process, the greater the risk that such damage will occur.

What is needed, therefore, is a system that overcomes problems such as those described above, at least in part.

SUMMARY

The above and other needs are met by a media processing system for processing media having differing properties, the media processing system having a base. The base has a base radial alignment portion, a base vertical alignment portion, and a base retention portion. A set of removable media clamps is included, where each of the set of removable media clamps is adapted for the differing properties of the media, each removable media clamp has removable media clamp radial alignment portion for engaging the base radial alignment portion and radially aligning the removable media clamp with the base, a removable media clamp vertical alignment portion for engaging the base vertical alignment portion and vertically aligning the removable media clamp with the base, and a media engagement portion for engaging the media. The retention portion is controllable by the media processing system to selectively retain and release a mounted one of the removable media clamps without manual intervention.

In this manner, the embodiments of the present invention enable quick exchange of removable media clamps having different properties, such as configurations for different sizes of media, with a relatively high degree of precision and repeatability, as generally compared to the manual procedure described above. The embodiments according to the present invention allow the system so equipped to quickly and easily load and unload more than two different sizes of media, and some of the embodiments enable this without the operator having to stop and manually reconfigure the system.

In various embodiments according to this aspect of the invention, a robotic arm engages and moves the media within the system. In some embodiments a robotic arm removes a current removable media clamp that is mounted on the base, moves the current removable media clamp to a store of the removable media clamps, selects a new removable media clamp, moves the new removable media clamp to the base, and mounts the new removable media clamp on the base. In some embodiments the same robotic arm performs all these function. In some embodiments the media is disk-based digital data storage media. In some embodiments the differing properties of the media include the size of the media. The media processing system in some embodiments is at least one of an optical measurement system, an electrical measurement system, an optical inspection system, and an electrical inspection system.

In some embodiments the base radial alignment portion is a central bore having a chamfered edge and the removable media clamp radial alignment portion is a stub depending from a bottom of the removable media clamp, where the stub is sized to engage within the bore, and the stub has a rounded edge for forming a single line of contact with an inner circumferential surface of the central bore. In some embodiments the base vertical alignment portion is a lip and the removable media clamp vertical alignment portion is a rim, where the lip and the rim engage one another with a sufficient precision so as to form a substantially air tight seal.

In some embodiments the retention portion includes ports formed in the base for drawing a vacuum between the base and the removable media clamp, thereby releasably retaining the removable media clamp against the base. In some embodiments the media processing system selectively retains and releases a desired one of the removable media clamps by selectively applying a vacuum between the base and the removable media clamp via the retention portion. In some embodiments the set of removable media clamps includes one removable media clamp sized for each size of media to be processed on the processing system.

According to another aspect of the invention there is described a method for mounting a removable media clamp, by providing a base having a central bore and a rim, and a removable media clamp having a stub with a rounded edge and a lip. The removable media clamp is mounted by inserting the stub of the removable media clamp into the central bore of the base such that the rounded edge forms a single line contact between the stub and a circumferential surface of the central bore. The stub and the central bore thereby provide radial alignment between the base and the removable media clamp. The lip of the removable media clamp is rested against the rim of the base, thereby providing vertical alignment between the base and the removable media clamp. A vacuum is selectively provided between the base and the removable media clamp, where the removable media clamp is retained to base when the vacuum is enabled, and the removable media clamp is removable from the base when the vacuum is not enabled.

In various embodiments according to this aspect of the invention the step of mounting the removable media clamp is performed by a robotic arm.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

The embodiments of the present invention generally provide a universal base piece that is manually attached to the system, which base piece engages a variety of different sizes or types of removable media clamps in simplified manner, which in some embodiments requires no operator intervention. Changing a removable media clamp to one that can handle a given size or configuration of media then becomes an operation that can be automatically controlled via the system controller, without the need for any operator intervention.

Figure 1:
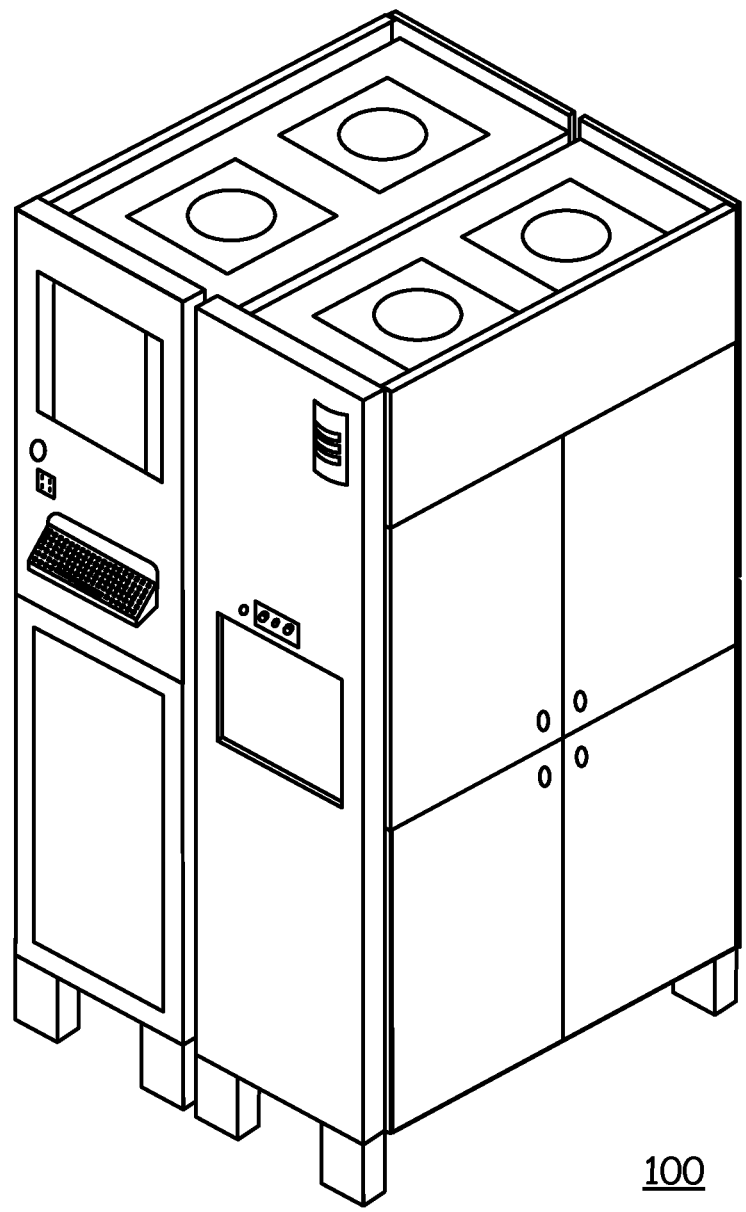
FIG. 1 is a perspective view a system according to an embodiment of the present invention.
Figure 2:
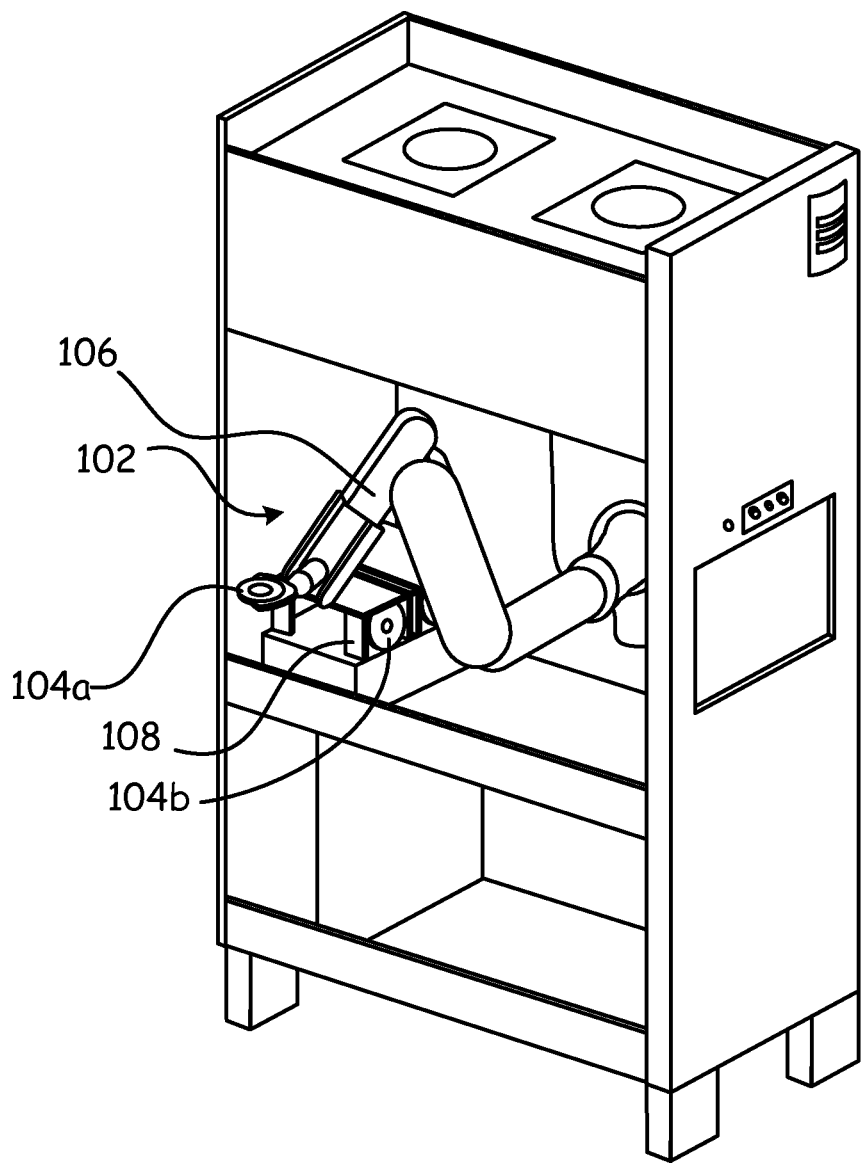
FIG. 2 is a perspective cutaway view a system according to an embodiment of the present invention, showing media and a robotic arm.

With reference now to FIG. 1, there is depicted a media processing system 100. The system 100 in various embodiments can perform one or more of a number of different operations on the media. For example, the system 100 in various embodiments is a measurement system, an optical inspection system, an electrical inspection system, an etcher, a coater, an exposure system, and so forth. With reference now to FIG. 2, there is depicted a robotic handler 102 disposed within the system 100. The handler 102 has a robotic arm 106 that grasps the media 104 in some manner, and moves it from one place to another within the system 100. For example the handler 102 can remove the media 104 from a cassette 108 and place the media 104 into a processing portion of the system 100. When processing is completed, the handler 102 then moves the media 104 back into the cassette 108. Media 104a and 104b are different sizes, in that at least a central aperture in the media 104a and 104b are different diameters. In other embodiments, the outside diameter of the media 104a and 104b can be of different diameters, for example.

Figure 3:
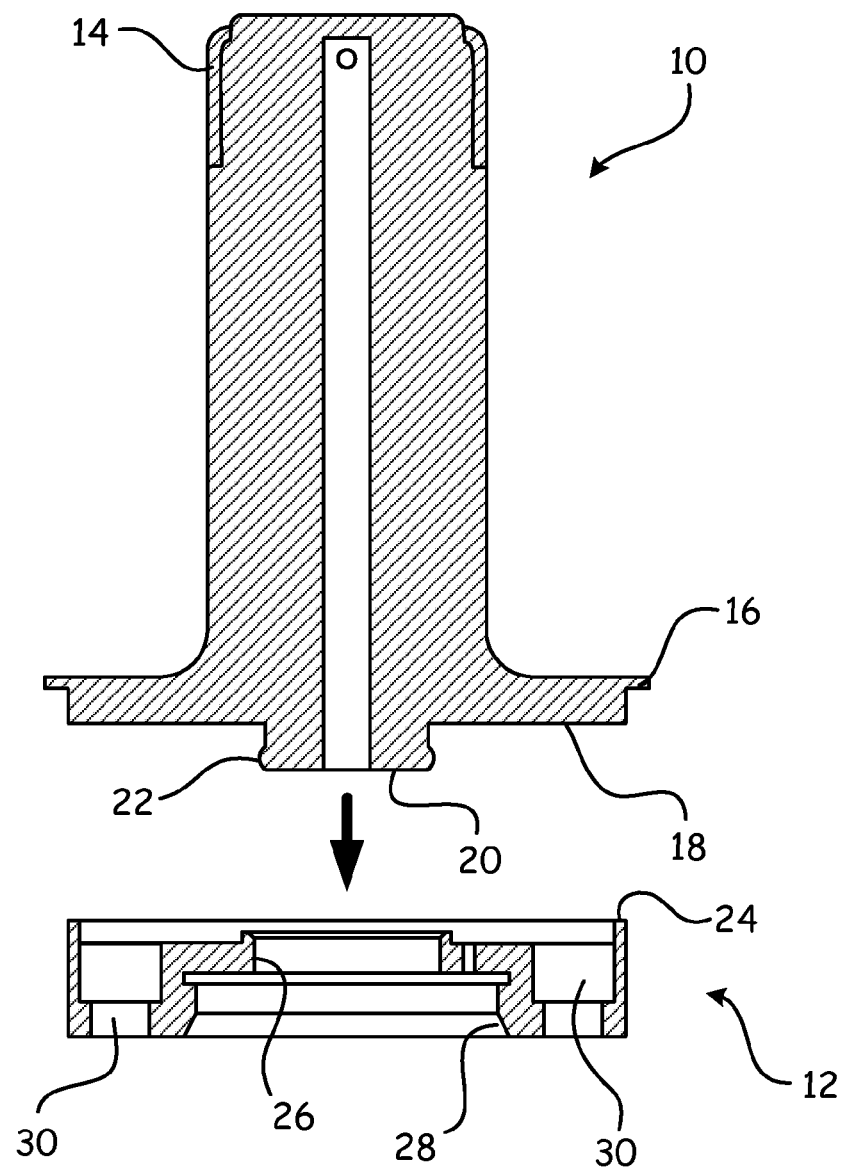
FIG. 3 is a cross-sectional view of a removable media clamp and a base according to an embodiment of the present invention.

With reference now to FIG. 3, there is depicted a cross section view of a removable media clamp 10, which accepts the media 104 from the handler 102, and holds the media 104 during processing in the system 100, such as during an inspection or measurement process. The removable media clamp 10 is configured for a certain configuration of media 104, such as a certain size of media 104 or a certain type of media 104. For example, the diameter of different removable media clamps 10 can be different sizes, so as to accommodate different sizes of media 104. In some embodiments, the specific nature of the clamping or grasping mechanism 14 that retains the media 104 to the removable media clamp 10 is different from one removable media clamp 10 to the next, so as to accommodate different sizes or configurations of media 104. Thus, according to some embodiments of the present invention, the removable media clamp 10 comes in a variety of different configurations, and can be easily swapped out to accommodate different sizes and configurations of media 104, in some embodiments without any direct intervention by the operator of the system 100.

This simplified or automated swapping process is enabled by the base 12, to which the removable media clamp 10 mounts. The base 12 is mounted such as by being screwed or clipped or bolted in some manner to the system 100. The mounting system used for attaching the base 12 to the system 100 is secure enough that it does not require inspection and adjustment with any kind of frequency or regularity. A recess 28 in the base 12 is provided in some embodiments, for engaging the mounting portion of the system 100 to which the base 12 is mounted, and assisting in the proper concentric and vertical alignment of the base 12 to the system 100.

The base 12 is designed to be a mount that releasably engages a variety of different removable media clamps 10. Thus, with the base 12 affixed to the system 100, the base 12 can then releasably engage a number of different removable media clamps 10, a store of which could be provided in a location within the system 100.

The base 12 includes several features that enable the functions and benefits described herein. A central bore 26 is provided in the base 12, which central bore 26 engages a locating stub 20, which is disposed on an underside of the removable media clamp 10. the bore 26 and the stub 20 operate in combination to centrally locate the removable media clamp 10 on the base 12. The stub 20 has a rounded edge 22, so that a sharp corner doesn't bind on the edge of the bore 26 as the stub 20 moves into the bore 26. Similarly, the bore 26 has a chamfered upper rim, so that the stub 20 slides easily into the bore 26. Both of these features, the chamfered upper rim and the rounded edge 22, enable the removable media clamp 10 and the base 12 to engage as desired, even when the alignment between the two during the engagement process is not exact.

The rounded edge 22 on the stub 20 also serves another function, in that in some embodiments it provides a single line of contact around the inner circumferential surface of the bore 26. By having only a single line of contact between the stub 20 and the bore 26, stiction between the stub 20 and the bore 26 is generally reduced, thereby aiding in the smooth engagement and disengagement of the removable media clamp 10 to and from the base 12.

While the stub 20 and bore 26 are used to align the removable media clamp 10 and the base 12 to one another radially, a lip 16 on the removable media clamp 10 and a rim 24 on the base 12 are used to align the removable media clamp 10 to the base 12 vertically. These two surfaces 16 and 24 in some embodiments are machined with a high degree of precision to engage one another to a very close tolerance. In some embodiments this takes the form of both of the surfaces 16 and 24 being extremely flat. However, in other embodiments the surfaces 16 and 24 are undulating or saw-toothed, but nonetheless engage one another with a very minimal gap between the two.

One reason for the high degree of precision between the two surfaces 16 and 24 is so that the exact position of the removable media clamp 10 is known by the system 100, which information can be programmed into the system 100. In this manner, the handler 102 doesn't unintentionally ram the media 104 through the removable media clamp 10, for example. Another reason for the high degree of precision between the two surfaces 16 and 24 is that it enables a convenient method for retaining the removable media clamp 10 with the base 12, which method is to draw a vacuum between the removable media clamp 10 and the base 12, such as through vacuum ports 30. The vacuum draws the surface 18 of the removable media clamp 10 toward the base 12, such that the removable media clamp 10 is retained by the base 12. Further, because of the radial alignment between the removable media clamp 10 and the base 12 as provided by the stub 20 and the bore 26, and the vertical alignment between the removable media clamp 10 and the base 12 as provided by the lip 16 and the rim 24, the position of the removable media clamp 10 and the grasping mechanism 14 are known by the system 100.

Figure 4:
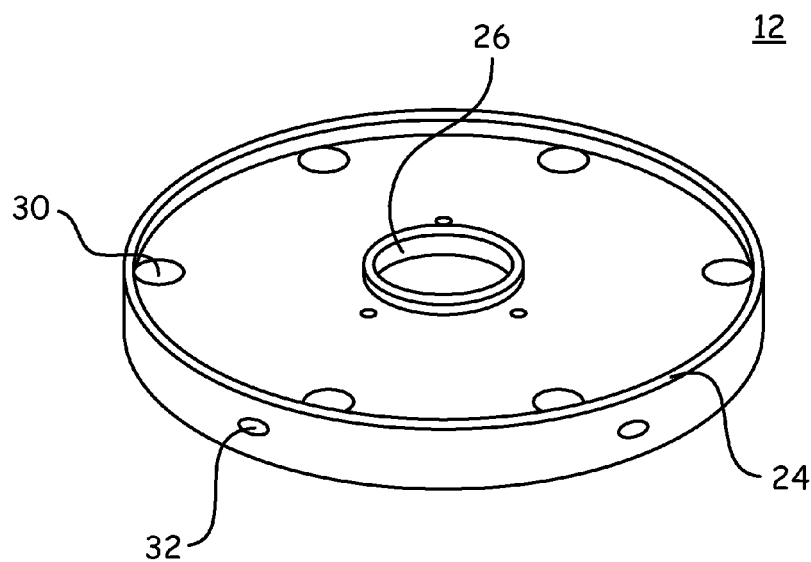
FIG. 4 is perspective view of a base according to an embodiment of the present invention.
Figure 5:
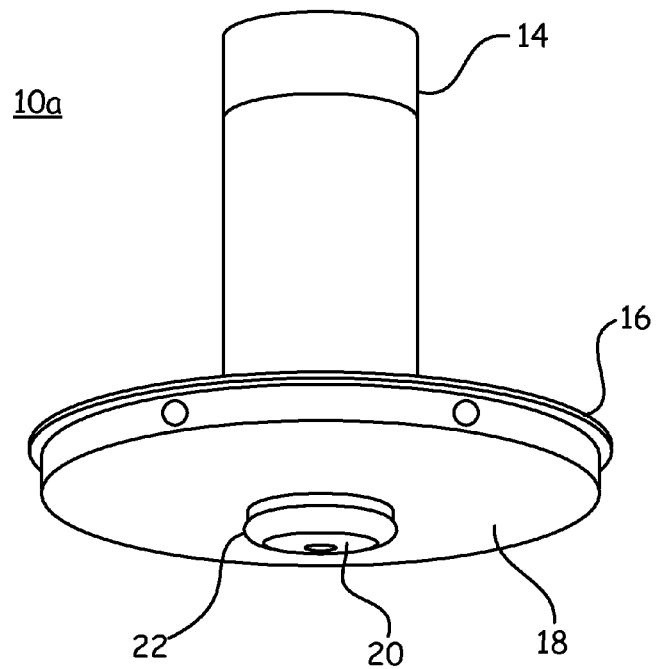
FIG. 5 is perspective view of a set or store of removable media clamps for different sizes of media, according to an embodiment of the present invention.
Figure 5:
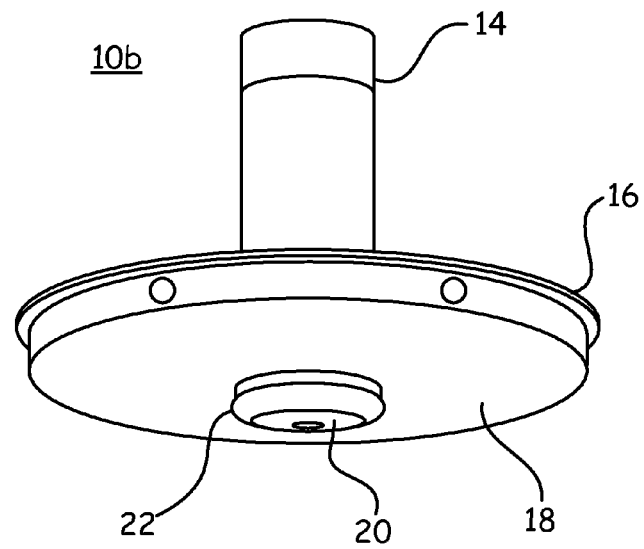
Figure 6:
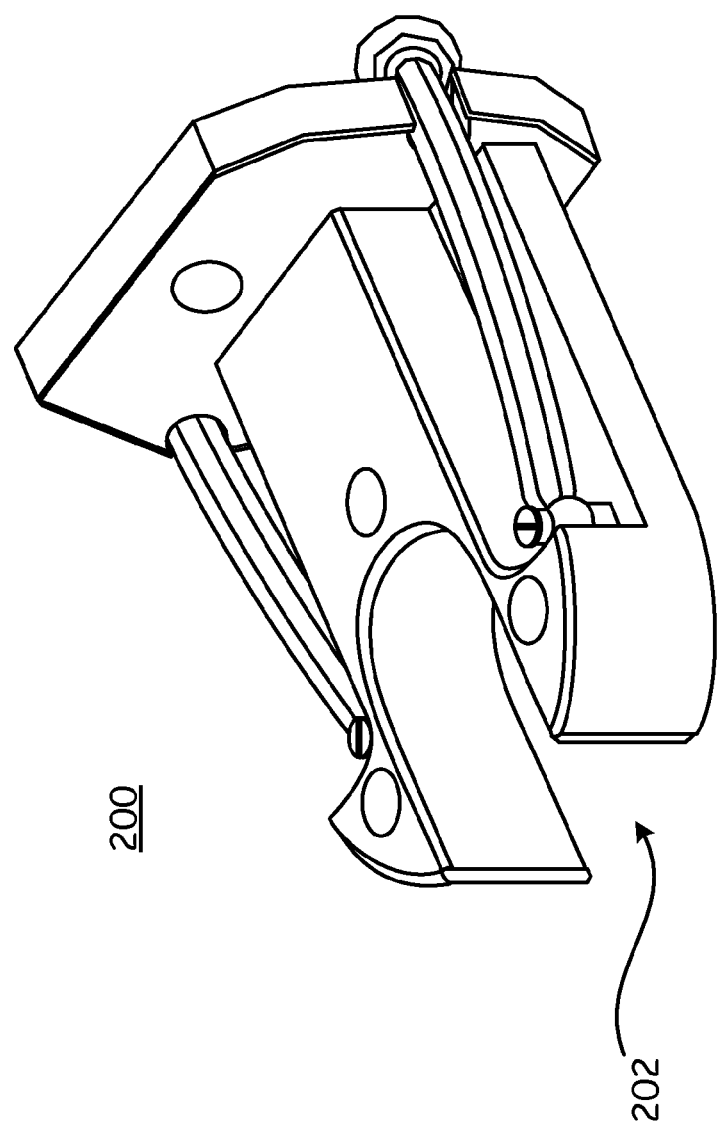
FIG. 6 is perspective view of a claw according to an embodiment of the present invention.

FIG. 4 is perspective view of the base 12, providing more detail in regard to the central bore 26, the vacuum ports 30, and the rim 24. Also depicted are threaded holes 32, such as could be used for bolting the base 12 to the system 100. FIG. 5 is a perspective view of a set or store of the removable media clamps 10a and 10b, for different sizes of media 104, providing additional detail in regard to the stub 20, the rounded edge 22, the surface 18, and the lip 16.

One embodiment of the use of the handler as describe above is now provided. The system 100 is loaded with a cassette 108 of media 104 of a given size, and the operator starts a processing program for the media 104 on the system 100, such as by selecting the program from a keyboard or touch screen. The system 100 identifies the media 104 by the program that has been selected. The system 100 then determines whether it has the proper removable media clamp 10 loaded in the system 100 for the identified media. If the proper removable media clamp 10 is indeed loaded in the system 100, then the system 100 processes the media 104 according to the selected program, by removing the media 104 from the cassette 108 with the robotic arm 106, moving it to proper removable media clamp 10 within the system 100, performing one or more operations on the media 104, and returning the media 104 to the cassette 108.

However, if the system 10 determines that the proper removable media clamp 10 for the selected media 104 is not currently installed in the system 100, then the system 100 can perform an action depending upon whether a manual or an automatic swap of the removable media clamps 10 is to be performed.

If the system 100 is only configured for a manual swap of the removable media clamps 10, then the system 100 signals the operator that a different removable media clamp 10 is required, and stops further processing. In some embodiments the system 100 also configures the elements of the system 100 so that the removable media clamp 10 to be swapped out is disposed in a convenient location for the operator to access. The vacuum that retains the current removable media clamp 10 to the base 12 is cut, so that the operator can easily remove the removable media clamp 10 from the base 12. The operator then places the desired removable media clamp 10, which in some embodiments is indicated on a display by the system 100, and signals to the system 100, such as through pressing a key, that the desired removable media clamp 10 is in place. The system 100 then restores the vacuum to the base 12, securing the removable media clamp 10 to the base 12, moves the base 12 and removable media clamp 10 into the proper position as needed, and continues with the normal processing of the media 104.

In this manner, the removable media clamp 10 is easily and quickly swapped out, without the operator having to unbolt the removable media clamp 10, bolt a new removable media clamp 10 in place, and perform a calibration of some sort to ensure that the new removable media clamp 10 is properly aligned. The vacuum retention of the removable media clamp 10 against the base 12 removes the need for any bolting and unbolting, and the radial alignment provided by the central bore 26 and the stub 20 and the vertical alignment provided by the lip 16 and the rim 28 remove the need for any calibration and alignment. Thus, the process for swapping the removable media clamp 10 is greatly simplified.

In some embodiments the replacement of the removable media clamp 10 is automated. In these embodiments, the system 100 directs the robotic arm 106 to engage a claw 200 that is adapted to grasp, hold, and move various sizes of removable media clamps 10, using an adjustable jaw 202. The vacuum to the base 12 is cut, so that the current removable media clamp 10 is not retained to the base 12. The robotic arm 106 uses the claw 200 to grasp the current removable media clamp 10 and remove it from the base 12. The robotic arm 106 then moves the removable media clamp 10 to where a store of removable media clamps 10 is disposed. In some embodiments this store is disposed within the system 100. In other embodiments the store is disposed outside of the system 100, but within reach of the robotic arm 106.

The robotic arm 106 moves the current removable media clamp 10 into a position within the store where the current removable media clamp 10 can be released from the claw 200 and reside until it is needed again. Once the current removable media clamp 10 has been placed within its position in the store, the robotic arm 106 moves to and grasps the desired removable media clamp 10 in the store, and moves it to the base 12. The robotic arm 106 moves the desired removable media clamp 10 toward the base 12 in such a manner that the stub 20 of the removable media clamp 10 begins to engage the central bore 26 of the base 12. The rounded edge 22 of the stub 20 and the chambered edge of the bore 26 enable the removable media clamp 10 and the base 12 to align properly one with another in a radial fashion, without binding, and with allowance for some slight degree of misalignment as the robotic arm 106 moves the removable media clamp 10 onto the base 12. The robotic arm 106 continues to move the removable media clamp 10 onto the base 12 until the rim 24 engages the lip 16.

Once the rim 24 and the lip 16 are engaged, the system 100 initiates the vacuum through the ports 30, drawing the removable media clamp 10 onto the base 12 and retaining the removable media clamp 10 in place. Once the desired removable media clamp 10 is attached in this manner to the system 100, the claw 200 is disengaged from the robotic arm 106, and the robotic arm 106 is moved to engage the media 104 as desired, and remove it from the cassette 108 for further processing, as described above. In some embodiments separate robotic arms are used for handling the media 104 and for using the claw 200.

In this manner, the interchange of removable media clamps 10 can be automated in the system 100 through software commands, bypassing the need for bring the system 100 down and manual intervention. This makes the interchange of removable media clamps 10 much faster than the manual interchange methods and thereby enables increased yield on the system 100. Further, the present embodiments provide for more precise handling of the removable media clamps 10, thereby protecting them from the damage that can otherwise occur through manual handling.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A media processing system for processing media having differing properties, the media processing system comprising:
   a base having a base radial alignment portion, a base vertical alignment portion, and a base retention portion, and
   a set of removable media clamps, each of the set of removable media clamps adapted for the differing properties of the media, each removable media clamp having,
      a removable media clamp radial alignment portion for engaging the base radial alignment portion and radially aligning the removable media clamp with the base,
      a removable media clamp vertical alignment portion for engaging the base vertical alignment portion and vertically aligning the removable media clamp with the base, and
      a media engagement portion for engaging the media,
   where the retention portion comprises ports formed in the base for drawing a vacuum between the base and a mounted one of the removable media clamps, where the vacuum alone is sufficient to retain the mounted one of the removable media clamps to the base, thereby releasably retaining the mounted one of the removable media clamps against the base, and the retention portion is controllable by the media processing system to selectively retain and release the mounted one of the removable media clamps without manual intervention.

2. The media processing system of claim 1, further comprising a robotic arm for engaging and moving the media within the system.

3. The media processing system of claim 1, further comprising a robotic arm for removing a current removable media clamp that is mounted on the base, moving the current removable media clamp to a store of the removable media clamps, selecting a new removable media clamp, moving the new removable media clamp to the base, and mounting the new removable media clamp on the base.

4. The media processing system of claim 1, further comprising a robotic arm for removing a current removable media clamp that is mounted on the base, moving the current removable media clamp to a store of the removable media clamps, selecting a new removable media clamp, moving the new removable media clamp to the base, mounting the new removable media clamp on the base, and for engaging and moving the media within the system.

5. The media processing system of claim 1, wherein the media is disk-based digital data storage media.

6. The media processing system of claim 1, wherein the differing properties of the media include size of the media.

7. The media processing system of claim 1, wherein the media processing system is at least one of an optical measurement system, an electrical measurement system, an optical inspection system, and an electrical inspection system.

8. The media processing system of claim 1, wherein the base radial alignment portion is a central bore having a chamfered edge and the removable media clamp radial alignment portion is a stub depending from a bottom of the removable media clamp, the stub sized to engage within the bore, the stub having a rounded edge for forming a single line of contact with an inner circumferential surface of the central bore.

9. The media processing system of claim 1, wherein the base vertical alignment portion is a lip and the removable media clamp vertical alignment portion is a rim, the lip and rim adapted to engage one another with a sufficient precision so as to form a substantially air tight seal.

10. The media processing system of claim 1, wherein the media processing system selectively retains and releases a desired one of the removable media clamps by selectively applying a vacuum between the base and the removable media clamp via the retention portion.

11. The media processing system of claim 1, wherein the set of removable media clamps includes one removable media clamp sized for each size of media to be processed on the processing system.

12. A media processing system for processing media having differing properties, the media processing system comprising:
   a base having a base radial alignment portion, a base vertical alignment portion, and a base retention portion, and
   a set of removable media clamps, each of the set of removable media clamps adapted for the differing properties of the media, each removable media clamp having,
      a removable media clamp radial alignment portion for engaging the base radial alignment portion and radially aligning the removable media clamp with the base,
      a removable media clamp vertical alignment portion for engaging the base vertical alignment portion and vertically aligning the removable media clamp with the base, and
      a media engagement portion for engaging the media, and
   a robotic arm for removing a current one of the removable media clamps that is mounted on the base, moving the current removable media clamp to a store of the removable media clamps, selecting a new one of the removable media clamps from the store, moving the new removable media clamp to the base, mounting the new removable media clamp on the base, and for engaging and moving the media within the system,
   where the retention portion is controllable by the media processing system to selectively retain and release a mounted one of the removable media clamps by enabling and disabling a vacuum between the base and a mounted one of the removable media clamps, where the vacuum alone is sufficient to retain the mounted one of the removable media clamps to the base.

13. The media processing system of claim 12, wherein the media processing system is at least one of an optical measurement system, an electrical measurement system, an optical inspection system, and an electrical inspection system.

14. The media processing system of claim 12, wherein the base radial alignment portion is a central bore having a chamfered edge and the removable media clamp radial alignment portion is a stub depending from a bottom of the removable media clamp, the stub sized to engage within the bore, the stub having a rounded edge for forming a single line of contact with an inner circumferential surface of the central bore.

15. The media processing system of claim 12, wherein the base vertical alignment portion is a lip and the removable media clamp vertical alignment portion is a rim, the lip and rim adapted to engage one another with a sufficient precision so as to form a substantially air tight seal.

16. The media processing system of claim 12, wherein the retention portion comprises ports formed in the base for drawing a vacuum between the base and the removable media clamp, thereby releasably retaining the removable media clamp against the base.

17. The media processing system of claim 12, wherein the media processing system selectively retains and releases a desired one of the removable media clamps by selectively applying the vacuum between the base and the removable media clamp via the retention portion.

18. A method for mounting a removable media clamp, the method comprising the steps of:
   providing a base having a central bore and a rim,
   providing a removable media clamp having a stub with a rounded edge and a lip, and
   mounting the removable media clamp by,
      inserting the stub of the removable media clamp into the central bore of the base such that the rounded edge forms a single line contact between the stub and a circumferential surface of the central bore, the stub and the central bore thereby providing radial alignment between the base and the removable media clamp, and
      resting the lip of the removable media clamp against the rim of the base, thereby providing vertical alignment between the base and the removable media clamp, and
   selectively providing a vacuum between the base and the removable media clamp, where the vacuum alone is sufficient to retain the removable media clamp to the base, where the removable media clamp is retained to the base when the vacuum is enabled, and the removable media clamp is removable from the base when the vacuum is not enabled.

19. The method of claim 18 wherein the step of mounting the removable media clamp is performed by a robotic arm.

* * * * *